United States Patent

Chiba et al.

Patent Number: 4,960,038
Date of Patent: Oct. 2, 1990

[54] DIAPHRAGM DEVICE

[75] Inventors: Masaaki Chiba; Hideki Maruhashi, both of Himeji, Japan

[73] Assignee: Mitsubishi Denki Kabushiki Kaisha, Tokyo, Japan

[21] Appl. No.: 265,985

[22] Filed: Nov. 2, 1988

[30] Foreign Application Priority Data

Nov. 9, 1987 [JP] Japan .................. 62-282554
Nov. 9, 1987 [JP] Japan .................. 62-282555
Nov. 9, 1987 [JP] Japan .................. 62-282556

[51] Int. Cl.$^5$ .................. F01B 19/00; F16J 3/00
[52] U.S. Cl. .................. 92/98 R; 92/99; 92/100
[58] Field of Search .................. 92/89, 90, 93, 94, 96, 92/97, 98 R, 99, 100

[56] References Cited

U.S. PATENT DOCUMENTS

| 2,748,797 | 6/1956 | Heizer et al. | 92/98 R |
| 2,764,097 | 9/1956 | Browne | 92/98 R |
| 3,312,171 | 10/1965 | Cary | 92/90 |
| 4,314,480 | 2/1982 | Becker | 92/98 R |
| 4,666,166 | 5/1987 | Hart et al. | 92/96 |
| 4,711,158 | 12/1987 | Kayyod et al. | 92/94 |

FOREIGN PATENT DOCUMENTS

| 1196032 | 7/1965 | Fed. Rep. of Germany | 92/98 R |
| 1081770 | 12/1954 | France | 92/90 |
| 7611429 | 11/1976 | France | 92/90 |
| 744889 | 2/1956 | United Kingdom | 92/98 R |
| 2105819 | 3/1983 | United Kingdom | 92/98 R |

Primary Examiner—Edward K. Look
Assistant Examiner—Thomas Denion
Attorney, Agent, or Firm—Sughrue, Mion, Zinn, Macpeak & Seas

[57] ABSTRACT

A diaphragm device utilized, for example, in a vacuum advance mechanism of a distributor of an internal combustion engine is disclosed. The diaphragm device comprises: a housing consisting of two cup-shaped members coupled to each other at the marginal flanges thereof; a diaphragm extending in the housing to define an airtight chamber therein; and a control rod coupled to the diaphragm to transmit the motion thereof. The outer marginal portion of the diaphragm is clamped between the flanges of the two cup-shaped housing members, wherein the distance between the radially extending flanges clamping the diaphragm therebetween is strictly controlled by a distance regulator, which may be constituted by a step formed in the outer portion of one of the flanges toward the other flange, the outer marginal portion of the diaphragm being received in the stepped-down inner portion of the stepped flange. The diaphragm may have an annular bead formed at the outer marginal portion which is tightly received into a corresponding groove formed in the opposing flange. Further, the distance regulator may be consituted by an axially bent peripheral portion of one of the flanges. In the case of an annular diaphragm, the inner marginal portion thereof is sandwiched between two stiffening annular disks, and an inner edge of one of the disks is bent toward the opposing surface of the other disk to regulate the distance therebetween.

3 Claims, 4 Drawing Sheets

DIAPHRAGM DEVICE

BACKGROUND OF THE INVENTION

1. Field of the Invention

The present invention relates to diaphragm devices, such as those used in a vacuum advance mechanism of a distributor for an internal combustion engine, and more particularly to improvements in the mounting and sealing structure of diaphragms therein.

2. Description of the Prior Art

Diaphragm devices are used, for example, in a vacuum advance mechanism of a distributor for an internal combustion engine. In such devices, diaphragms are usually tightly clamped between two rigid flat members at the marginal portions thereof, to define with a housing member a hermetically sealed chamber.

FIG. 1a shows an axial cross section of an example of a diaphragm device which forms part of a vacuum advance mechanism of a distributor for an internal combustion engine. The housing of the device consists of two cup-shaped members, housing top 1a and bottom 1b, and a diaphragm 2 is tightly held between the housing top 1a and the housing bottom 1b at the outer marginal portion thereof, to define with the housing top 1a a vacuum chamber 3a thereabove, and an atmospheric pressure chamber 3b therebelow with the housing bottom 1b. The central portion of the diaphragm 2 is held between a pair of stiffening disks 4a and 4b of metal which are clamped together by rivets 5a and 5b. A control rod 6 is coupled to a central convex portion of the lower stiffening disk 4b at the top end thereof, and extends through a central aperture 1c of the housing bottom 1b. The other end of the control rod 6 is coupled to the ignition advancing plate (not shown) within the distributor to transmit axial displacement of the diaphragm 2 thereto so that the ignition timing is advanced in proportion to the displacement. A helical spring 7 reacting against the bottom portion of the cup-shaped housing top 1a bears against the upper stiffening disk 4a to urge the diaphragm 2 to the neutral or zero advance position. A suction pipe 1d communicates the vacuum chamber 3a to a portion of an intake manifold (not shown) of the internal combustion engine immediately upstream of an unillustrated throttle thereof, so that suction from the chamber 3a through the pipe 1d increases as the degree of opening of the throttle increases. The atmospheric pressure chamber 3b, on the other hand, communicates with the atmosphere through the central aperture 1c formed in the housing bottom 1b. Thus, when the suction within the vacuum chamber 3a increases, the diaphragm 2 is moved upward in the FIG. 1a against the biasing force of the spring 7, due to the pressure difference across the two chambers 3a and 3b. The resulting displacement of the diaphragm 2 is transmitted to the ignition advancing plate within the distributor through the control rod 6 so that the ignition timing is advanced.

FIG. 1b is an enlarged view of the portion within circle A in FIG. 1a, showing the mounting and sealing structure of the outer marginal portion of the diaphragm. The marginal portion of the housing top 1a is formed into a radially extending flat annular flange 10a. The marginal portion of the bottom 1b of the housing is formed into a clamping structure of inwardly open U-shaped cross section, wherein the outer marginal portion 2a of the diaphragm 2 is inserted between a radially outwardly extending flat annular flange portion 10b of the U-shaped marginal structure of the housing bottom 1b and a flange 10a of the housing top 1a, the flange 10a and the marginal portion 2a of the diaphragm 2 being held between the flange portion 10b and the inwardly bent extension 11b of the U-shaped marginal portion of the housing bottom 1b. The two radially extending flat annular portions 10b and 11b of the housing bottom 1b are clamped together by a press, so that the marginal portion 2a of the diaphragm 2 is held tightly between the flanges 10a and 10b of the housing top 1a and the housing bottom 1b, wherein the thickness of the clamped marginal portion 2a of the diaphragm 2 is reduced by the clamping pressure, compared with the original thickness of the non-compressed portion of the diaphragm 2, thereby ensuring airtight sealing thereat.

The mounting structure of the diaphragm shown in FIG. 1b has the following disadvantage. Namely, even when the pressure and the stroke of the clamping press are maintained strictly at predetermined magnitudes, the thickness reduction in the marginal portion 2a of the diaphragm 2 due to the clamping force tends to vary from one device to another and can hardly be maintained at a constant magnitude, due to random variations in the component parts, etc. Thus, if the thickness reduction of the diaphragm 2 by clamping force happens to be too great, the clamped marginal portion 2a of the diaphragm 2 may be stretched beyond limit and torn thereat. On the other hand, too small thickness reduction at the clamped marginal portion 2a of the diaphragm 2 may result in inadequate airtight sealing thereat.

FIG. 2a shows another diaphragm device forming part of a vacuum advance mechanism of a distributor for an internal combustion engine. The structure and operation of the device of FIG. 2a is similar to those of the device of FIG. 1a, wherein like reference numerals represent like or corresponding parts or portions. However, the inner marginal portion of an annular diaphragm 2 is mounted, together with inner marginal portions of the annular stiffening disks 4a and 4b, to a top end portion 6a of a control rod 6. Namely, as shown in FIG. 2b illustrating the portion within circle B in FIG. 2a on an enlarged scale, the inner marginal portion 2b of the diaphragm 2 held between the inner marginal portions of annular stiffening disks 4a and 4b is inserted together therewith into an annular recess formed in the side surface of a cylindrical top portion 6a of a control rod 6 to be tightly clamped therein between the disks 4a and 4b, wherein the thickness of a clamped inner marginal portion 2b is reduced by the clamping pressure exerted thereon, compared with the original thickness of the unclamped portion of the diaphragm 2, so that airtight sealing thereat is ensured.

The mounting structure of the inner marginal portion 2b of the diaphragm 2 to the control rod 6 has the same disadvantage as the mounting structure of the outer marginal portion of the diaphragm shown in FIG. 1b. Namely, the unavoidable variation in the clamping thickness reduction results in a failure or an unsufficient sealing of the clamped inner marginal portion 2b of the diaphragm 2.

U.S. Pat. No. 3,572,301 discloses a vacuum advance mechanism including a diaphragm device which has a structure different from those described above. Each one of the diaphragm devices disclosed in the U.S. patent comprises two annular diaphragms, the outer marginal portions of which are held tightly between a radially extending annular flange portion of a housing member and a flat annular surface of a rigid spacer ring opposing thereto. An annular inner marginal portion of one of the diaphragms of a first device (shown in FIG. 1 thereof) is sealed by an annular inner edge portion of a carrier member which is bent over the adjoining inner marginal portion of the diaphragm and maintains it in sealing engagement with an annular gasket interposed between the bent-over inner edge of the carrier and the diaphragm. Inner marginal portions of other diaphragms are sealed by a structure similar to that shown in FIG. 2b. Thus, the mounting and sealing structures of the outer or inner marginal portions of the diaphragms disclosed in the aforementioned U.S. patent suffer the same disadvantage as the above-described mounting structures.

SUMMARY OF THE INVENTION

Thus, an object of the present invention is to provide a diaphragm device, such as those used in a vacuum advance mechanism of a distributor for an internal combustion engine, wherein a diaphragm can be mounted in an airtight manner without any danger of causing damage to the diaphragm. More particularly, the present invention aims at providing a diaphragm device in which the diaphragm can be mounted in such a way that the thickness reduction of the tightly clamped marginal portions of the diaphragm due to the clamping pressure exerted thereon can be controlled to an optimum magnitude to ensure airtight engagement without incurring any danger of failure to the diaphragm thereat.

A further object of the present invention is to provide such a diaphragm device which is simple in structure and can be produced at low cost.

A still further object of the present invention is to provide a mounting and sealing structure of a diaphragm which is applicable to a wide variety of diaphragm devices including all the above-described types.

A diaphragm device according to the present invention comprises a housing and a diaphragm extending therein to define an airtight chamber. The housing may comprise, for example, two cup-shaped members coupled to each other at the marginal portions thereof. The diaphragm may be disk-shaped or annular, and is mounted to the housing at the outer marginal portion thereof. In the case where the diaphragm is annular, the inner marginal portion of the diaphragm is mounted and sealed, for example, to a rod-shaped member such as a control rod of the diaphragm device of a vacuum advance mechanism. The inner or outer marginal portion of the diaphragm is clamped between two opposing surface members, the distance between the two surfaces being regulated by distance regulating means, which comprises, for example, an annular member extending from one of the two surfaces to the other surface to determine the distance therebetween.

In the case where the housing comprises two cup-shaped members coupled to each other, the two surfaces clamping therebetween the outer marginal portion of the diaphragm may comprise the radially outwardly extending flanges of the two cup-shaped members formed at the marginal portion thereof; the distance regulating means in such a case may comprise a step formed in one of the flanges, the outer marginal portion of the diaphragm being tightly received between the stepped-down portion in an inner half of the stepped flange and an opposing surface of the other flange. In this case, the diaphragm may have an annular bead of enlarged thickness formed at the outer marginal portion thereof, which is tightly received in a groove formed in the opposing flange of one of the cup-shaped members. In another preferred structure according to the present invention, the distance regulating means comprises a peripheral extension of one of the two clamping surface members which is bent into the axial direction toward the other clamping surface. This mounting and sealing structure is applicable to the mounting of both the inner and outer marginal portions of the diaphragm.

BRIEF DESCRIPTION OF THE DRAWINGS

The novel features which are believed to be characteristic of the present invention are set forth with particularity in the appended claims. The details of the present invention itself, however, both as to its structure and operation, together with further objects and advantages thereof may best be understood by reference to the following detailed description of the preferred embodiments, taken in conjunction with the accompanying drawings, in which:

FIG. 1b is an enlarged sectional view of the portion within circle A in FIG. 1a;

FIG. 2b is an enlarged sectional view of the portion within circle B in FIG. 2a;

In the drawings, like reference numerals and characters represent like or corresponding parts or portions.

DETAILED DESCRIPTION OF THE PREFERRED EMBODIMENTS

Figure 3:
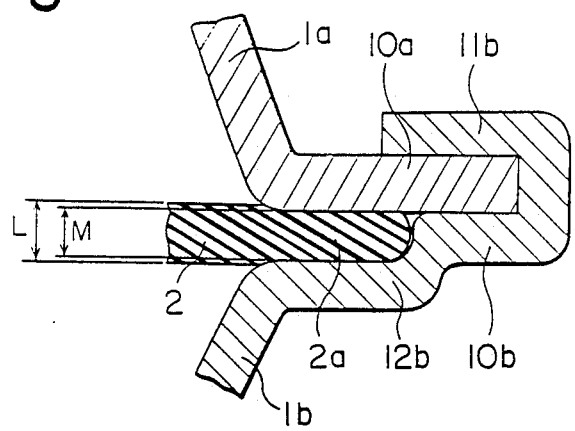
FIG. 3 is a view similar to FIG. 1b, but showing a mounting and sealing structure of the outer marginal portion of a diaphragm of a diaphragm device according to the present invention.

Referring now to FIG. 3 of the drawings, a first embodiment according to the present invention is described.

Figure 1A:
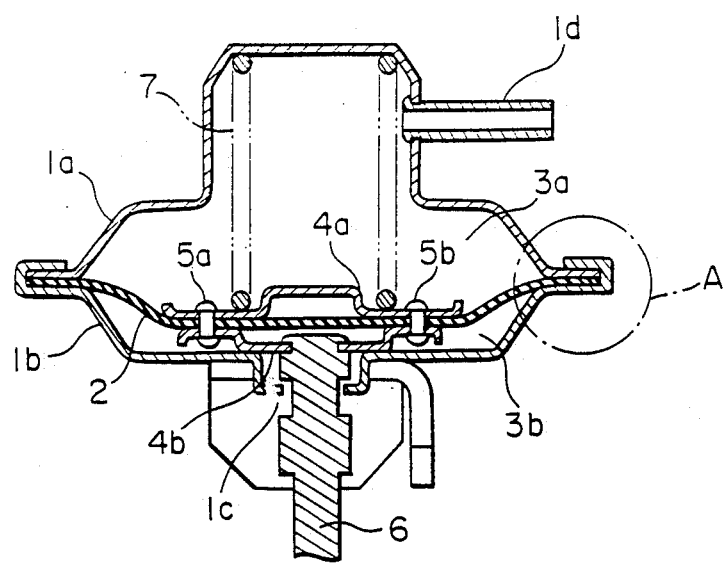
FIG. 1a is an axial sectional view of a conventional diaphragm device forming part of a vacuum advance mechanism of a distributor for an internal combustion engine.

FIG. 3 shows the mounting and sealing structure of a diaphragm of a diaphragm device forming part of a vacuum advance mechanism of an internal combustion engine. The overall structure of the diaphragm device of FIG. 3 is similar to that shown in FIG. 1a or 2a. The marginal portion of a cup-shaped housing top 1a is formed into a radially outwardly extending annular flange 10a. The marginal portion of a cup-shaped housing bottom 1b is formed into a radially outwardly extending annular flange 10b, the peripheral portion thereof being bent first into the axial direction and then into radially inward direction to form a U-shaped cross-sectional clamping structure, the peripheral portion of the flange 10a being inserted between the two radially extending opposing flat annular portions 10b and 11b thereof. The outer half portion of the radially outwardly extending flange portion 10b is stepped in the axial direction toward the flange 10a of the housing top 1a by a height M, which is smaller than the original or non-compressed thickness L of the diaphragm 2. An outer marginal portion 2a of the diaphragm 2 is held tightly between a stepped-down portion 12b of the flange 10b of the housing bottom 1b and the flange 10a of the housing top 1a, the thickness of the clamped outer marginal portion 2a being compressed by a predetermined difference (L−M) between the original thickness L of the diaphragm 2 and the height M of the step.

The outer marginal portion of the diaphragm 2 is mounted and sealed as shown in FIG. 3 as follows. First, the outwardly extending flanges 10a and 10b of the housing top 1a and the housing bottom 1b are formed, respectively. Further, the step is formed in the flange 10b of the housing bottom 1b, and the peripheral portion of the flange 10b is bent into the axial direction. Next, the outer marginal portion 2a of the diaphragm 2 is positioned on the stepped-down portion 12b of the flange 10b of the housing bottom 1b, as shown in FIG. 3, and the flange 10a of the housing top 1a is superposed thereon. Further, the axially bent peripheral portion of the flange 10b of the housing bottom 1b is bent inwardly over the flange 10a and pressed by a press to clamp the outer periphery of the flange 10a between the opposing annular flanges 10b and 11b. Thus, the outer marginal portion 2a is tightly pressed between the upper surface of the stepped-down portion 12b of the flange 10b and the lower surface of the flange 10a of the housing top 1a, the thickness thereof being reduced by the constant predetermined magnitude (L-M).

Although FIG. 3 shows a mounting structure in which the stepped-down portion 12b for receiving the outer marginal portion 2a of the diaphragm 2 is formed in the flange 10b having the U-shaped cross-sectional clamping structure including the inwardly bent portion 11b, the step for receiving the marginal portion 2a of the diaphragm 2 may be formed in the opposing flange 10a of the housing top 1a. Further, in the case of an annular diaphragm, the mounting and sealing structure shown in FIG. 3 is applicable to the mounting and sealing of the inner marginal portion of the diaphragm.

Figure 4:
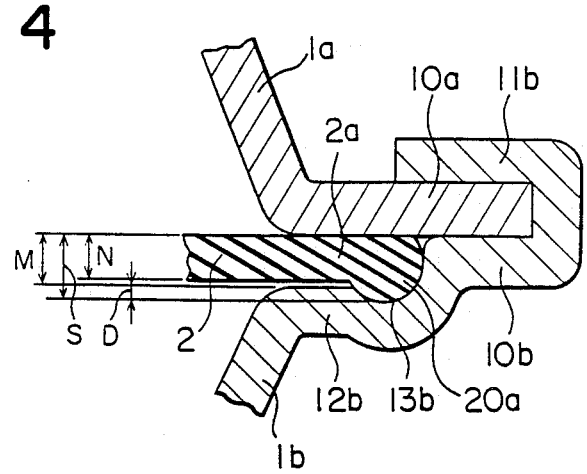
FIGS. 4, 5 and 7 are also views similar to FIG. 1b, but showing further mounting and sealing structures of the outer marginal portion of a diaphragm of a diaphragm device according to the present invention.

FIG. 4 shows a second mounting and sealing structure of the outer marginal portion of a diaphragm according to the present invention. The structure shown in FIG. 4 is similar to that shown in FIG. 3, except that the diaphragm 2 has an annular bead 20a formed at the outer marginal portion 2a thereof and the bead 20a is received into a groove 13b formed in the stepped-down portion 12b of the flange 10b. More precisely, the annular bead 20a of semicircular cross section projects in the axial direction from the lower surface of the periphery of the outer marginal portion 2a of the diaphragm 2. The groove 13b formed on the upper surface of the outer portion of the stepped-down portion 12b of the flange 10b has an arc-shaped cross section of a corresponding dimension to receive the bead 20a tightly therein. The thickness N of the diaphragm 2 outside of the bead 20a, on the other hand, is smaller than the drop M of the stepped-down portion 12b, so that the outer marginal portion 2a of the diaphragm 2 outside of the bead 20a is not compressed due to the existence of the clearance (M−N) thereat. The bead 20a, however, is tightly received into the groove 13b and compressed between the flange 10a and the groove 13b. Namely, the axial dimension T of the bead 20a, i.e., the thickness of the diaphragm 2 at the bead 20a, is greater than the sum S=M+D of the axial drop M of the stepped-down portion 12b and the axial depth D of the groove 13b, so that the bead 20a of the diaphragm 2 is axially compressed by the difference (T−S), thereby ensuring airtight sealing thereat.

The mounting of the outer marginal portion of the diaphragm as shown in FIG. 4 can be effected substantially in the same manner as that shown in FIG. 3. Namely, the marginal portion of the cup-shaped housing bottom 1b is formed into an outwardly extending flange 10b having the stepped-down portion 12b with the groove 13b and the outer peripheral portion of the flange 10b is bent into the axial direction toward the housing top 1a. In addition, the outer marginal portion of the housing top 1a is formed into the outwardly extending flange 10a. Then, the marginal portion 2a of the diaphragm 2 having the bead 20a is positioned on the stepped-down portion 12b of the flange 10b so that the bead 20a is received into the groove 13b, and the flange 10a of the housing top 1a is placed thereon as shown in FIG. 4. Further, the peripheral portion 11b of the axially-bent portion of the flange 10b is bent inwardly over the flange 10a and pressed thereon by a press. As a result, the bead 20a is tightly pressed into the groove 13b, and an airtight sealing thereat is ensured.

Figure 5:
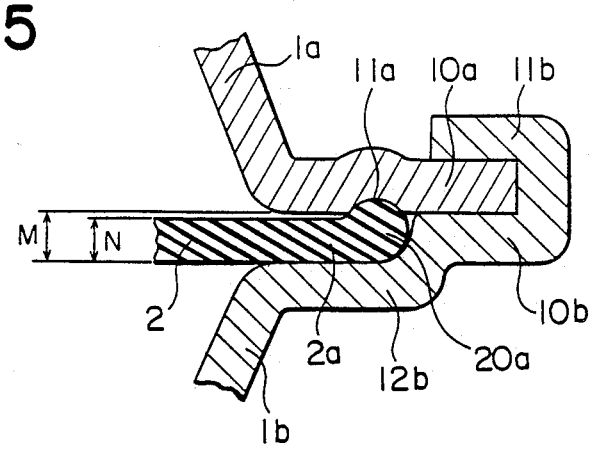

FIG. 5 shows a mounting structure of the outer marginal portion of a diaphragm similar to that shown in FIG. 4. However, in the structure of FIG. 5, a bead 20a of semi-circular cross section formed at an outer marginal portion 2a of a diaphragm 2 projects from the upper surface thereof in the axial direction toward a flange 10a of a housing top 1a, in which a groove 11a of corresponding arc-shaped cross-section is formed to receive the bead 20a therein. Otherwise, the structure of FIG. 5 is similar to that of FIG. 4.

It is possible to combine the features shown in FIGS. 4 and 5 to obtain a structure in which the bead formed at the outer marginal portion 2a of the diaphragm 2 projects both from upper and lower surfaces in the axial direction and grooves are formed both on the flange 10a of the housing top 1a and on the stepped-down portion 12b of the flange 10b of the housing bottom 1b. Further, the structures shown in FIGS. 4 and 5 are applicable to the mounting and sealing of the inner marginal portion of an annular diaphragm.

Figure 2A:
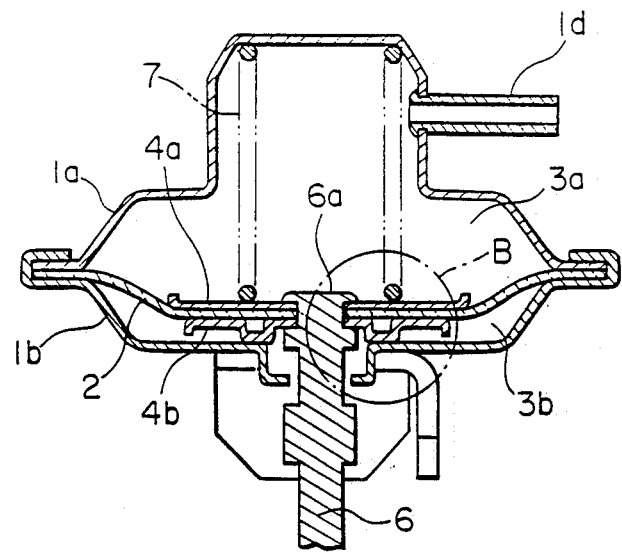
FIG. 2a is a view similar to FIG. 1a, but showing another conventional diaphragm device forming part of a vacuum advance mechanism.
Figure 2B:
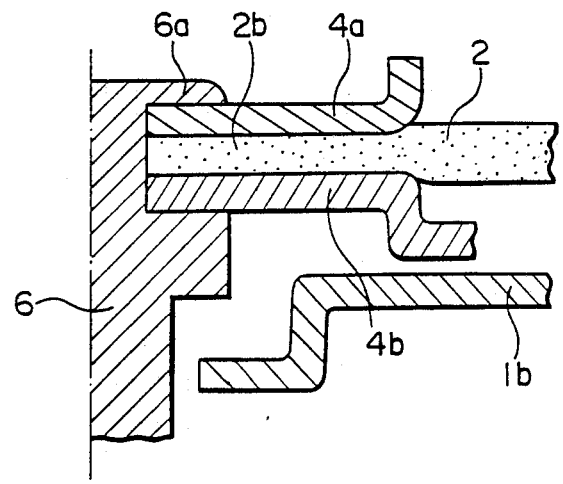
Figure 6:
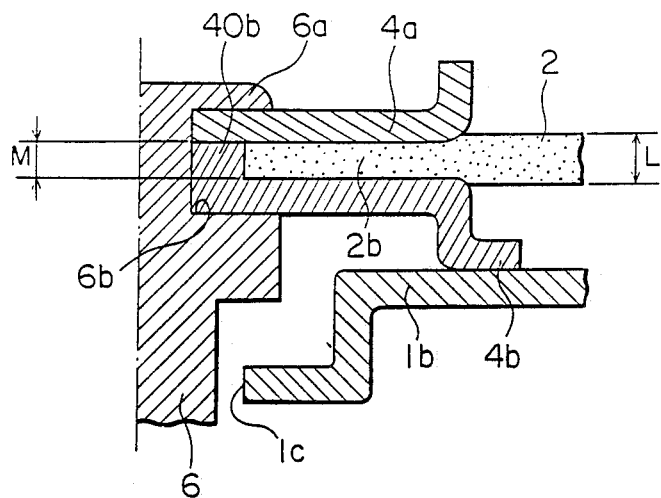
FIG. 6 is a view similar to FIG. 2b, but showing a mounting and sealing structure of the inner marginal portion of a diaphragm of a diaphragm device according to the present invention.

FIG. 6 shows a mounting and sealing structure of the inner marginal portion of a diaphragm of a diaphragm device forming part of a vacuum advance mechanism of a distributor for an internal combustion engine, the overall structure of which is similar to that shown in FIG. 2a. An inner marginal portion 2b of an annular diaphragm 2 is tightly held between the inner marginal portions of a pair of annular disk-shaped rigid stiffening members 4a and 4b of metal sheet, and is inserted together therewith into an angular recess 6b formed on the outer side surface of a cylindrical top end portion 6a of a control rod 6 extending through a central aperture 1c in a housing bottom 1b. The inner edge portion of the lower stiffening disk 4b is bent in the axial direction to form a distance regulating portion 40b extending from the upper surface of the lower stiffening disk 4b to the lower surface of the upper stiffening disk 4a. The axial height M of the distance regulating portion 40b is smaller than the original or non-compressed thickness L of the diaphragm 2, so that the inner marginal portion 2b of the diaphragm 2 is compressed by the constant predetermined magnitude (L−M). The dimensions L and M may take the same values as in the case of the first embodiment shown in FIG. 3.

The mounting of the inner marginal portion of the diaphragm as shown in FIG. 6 is effected as follows. The inner edge of the lower stiffening disk 4b is bent axially to form the distance regulating annular projection 40b having a height M, and the inner marginal portion 2b of the diaphragm 2 is sandwiched between the upper and lower stiffening disks 4a and 4b as shown in FIG. 6, and is inserted together therewith into the side recess 6b formed on the top end portion 6a of the control rod 6, wherein the annular recess 6b has an axial breadth enough to receive therein the inner edge portions of the stiffening disks 4a and 4b holding therebetween the inner marginal portion 2b of the diaphragm 2 having a thickness L. Next, the top end of the control rod 6 is pressed by a press to reduce the axial breadth of the recess 6b until the top end of the projection 40b abuts against the lower surface of the upper stiffening disk 4a. Thus, the thickness of the inner marginal portion 2b of the diaphragm 2 is compressed by the constant predetermined magnitude (L−M), the axial height M of the projection 40b regulating the final distance between the surfaces of the disks 4a and 4b clamping the inner marginal portion 2b of the diaphragm 2 therebetween.

Figure 1B:
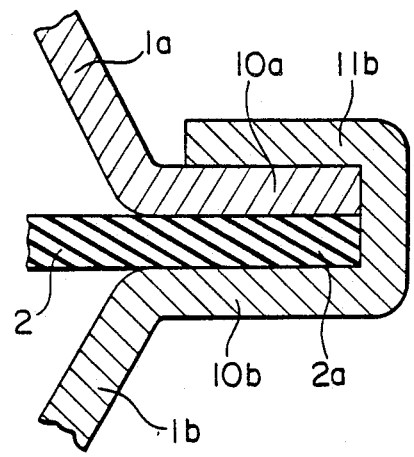
Figure 7:
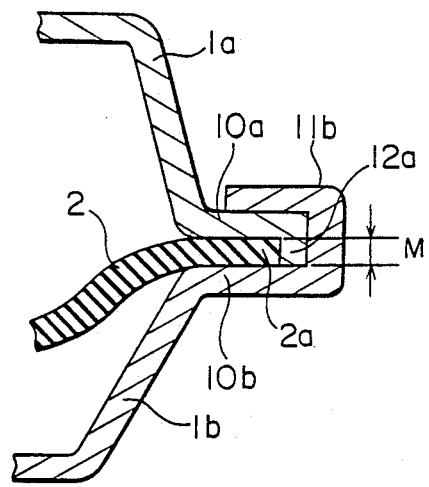

FIG. 7 shows a mounting and sealing structure of the outer marginal portion of a diaphragm of a diaphragm device which is similar to those described above. The mounting structure shown in FIG. 7 is similar to that shown in FIG. 1b. However, the outer peripheral portion of the radially outwardly extending annular flange 10a is bent in the axial direction to form a distance regulating projection 12a which has a function similar to that of the projection 40b of the disk 4b shown in FIG. 6. Namely, the axial height M of the projection 12a regulates the axial distance between the radially outwardly extending flanges 10a and 10b clamping the outer marginal portion 2a of the diaphragm 2 therebetween, thereby controlling the thickness reduction of the clamped outer marginal portion 2a of the diaphragm 2.

In the structures shown in FIGS. 6 and 7, the distance regulating portions 40b and 12a are formed integrally with the stiffening disk 2b and the flange 10a, respectively. However, these distance regulating portions may be formed by separate rings of similar shapes and dimensions.

While description has been made of particular embodiments of the present invention, it will be understood that many modifications may be made without departing from the spirit thereof; the appended claims are contemplated to cover any such modifications as fall within the true spirit and scope of the present invention.

What is claimed is:

1. A diaphragm device, comprising:
a housing;
a diaphragm extending in said housing to define an airtight chamber therein:
clamping means for clamping a marginal portion of said diaphragm in airtight engagement said clamping means including a first and a second surface tightly clamping said marginal portion of said diaphragm therebetween;
distance regulating means for regulating the distance between said first and second surfaces of said clamping means to a predetermined magnitude to control a reduction in thickness of said clamped marginal portion of said diaphragm with respect to a thickness thereof in a free state, the reduction in thickness being caused by a pressure exerted thereon by said first and second surfaces of said clamping means; wherein said housing includes two cup-shaped members coupled to each other at marginal portions thereof, said cup-shaped members each having a radially outwardly extending flange formed at the marginal portion thereof;
said clamping means includes said radially extending flanges of said cup-shaped members, annular surfaces of said flanges facing toward each other constituting said first and second surfaces of the clamping means and clamping an outer marginal portion of said diaphragm therebetween, wherein a peripheral portion of the flange of one of said cup-shaped members is bent first axially toward the other cup-shaped member, and then radially inwardly over the flange portion of the cup-shaped member, to form a radially inwardly open U-shaped cross-sectional clamping structure,
said distance regulating means comprises an annular step formed in an outer portion of the radially outwardly extending flange of one of said cup-shaped members, the outer marginal portion of the diaphragm being clamped between a stepped-down inner portion of the stepped flange of said one of the cup-shaped members and the annular surface of the flange of the other cup-shaped member, the axial height of said step controlling the thickness reduction of the clamped outer marginal portion of said diaphragm, and
wherein said diaphragm has an annular bead of enlarged thickness formed at the outer marginal portion thereof, and the radially outwardly extending flange of one of said cup-shaped members has an annular groove formed on the annular surface thereof opposing the flange of the other cup-shaped member to receive said annular bead of said diaphragm therein, said diaphragm being tightly clamped between the radially outwardly extending flanges of said cup-shaped members at said bead of enlarged thickness, the sum of the axial height of said step and the axial depth of said groove controlling the thickness reduction of the annular bead formed at the marginal portion of said diaphragm, the remaining portion of the outer marginal portion of the diaphragm other than said annular bead having a thickness smaller than an axial distance between those portions of the opposing surfaces of the radially outwardly extending flanges of said cup-shaped members which face said remaining portion of the outer marginal portion of said diaphragm other than said annular bead.

2. A diaphragm device comprising:
a housing;
a diaphragm extending in said housing to define an airtight chamber therein;
clamping means for clamping a marginal portion of said diaphragm in airtight engagement, said clamping means including a first and a second surface tightly clamping said marginal portion of said diaphragm therebetween;
distance regulating means for regulating the distance between said first and second surfaces of said clamping means to a predetermined magnitude to control a reduction in thickness of said clamped marginal portion of said diaphragm with respect to a thickness thereof in a free state, the reduction in thickness being caused by a pressure exerted thereon by said first and second surfaces of said clamping means; wherein said housing includes two cup-shaped members coupled to each other at marginal portions thereof, said cup-shaped members each having a radially outwardly extending flange formed at the marginal portion thereof;

said clamping means includes said radially extending flanges of said cup-shaped members, annular surfaces of said flanges facing toward each other constituting said first and second surfaces of the clamping means and clamping an outer marginal portion of said diaphragm therebetween, wherein a peripheral portion of the flange of one of said cup-shaped members is bent first axially toward the other cup-shaped member, and then radially inwardly over the flange portion of the cup-shaped member, to form a radially inwardly open U-shaped cross-sectional clamping structure.

an annular peripheral portion of said radially outwardly extending flange of the other cup-shaped member is bent axially toward said one of the cup-shaped members, the axially bent annular portion of said other cup-shaped member being inserted into the inside of said inwardly open U-shaped cross-sectional clamping structure of said one of the cup-shaped members together with the outer marginal portion of said diaphragm which lies at the inner side of said axially bent portion of said other cup-shaped member to be clamped between the radially outwardly extending flanges of said cup-shaped members, and wherein said axially bent portion constitutes said distance regulating means, the thickness reduction of the clamped outer marginal portion of said diaphragm being controlled by an axial height of said axially bent portion of said other cup-shaped member.

3. A diaphragm device comprising:

a housing;

a diaphragm extending in said housing to define an airtight chamber therein;

clamping means for clamping a marginal portion of said diaphragm in an airtight engagement, said clamping means including a first and a second surface tightly clamping said marginal portion of said diaphragm therebetween;

distance regulating means for regulating the distance between said first and second surfaces of said clamping means to a predetermined magnitude to control a reduction in thickness of said clamped marginal portion of said diaphragm with respect to a thickness thereof in a free state, the reduction in thickness being caused by a pressure exerted thereon by said first and second surfaces of said clamping means; wherein said diaphragm has the form of an annulus having a central hole; and said diaphragm further comprises:

a rod-shaped member extending through said central hole in said annular diaphragm and having formed at a side surface thereof an annular recess; and a pair of annular disk-shaped stiffening members holding a central portion of said diaphragm therebetween, central holes in said annular disk-shaped stiffening members being in axial alignment with said central hole in said annular diaphragm; wherein an inner marginal portion of said annular diaphragm, together with inner marginal portions of said annular disk-shaped stiffening members, is tightly received into said annular recess in said rod-shaped member so as to be clamped between opposing surfaces of said inner marginal portions of said annular disk-shaped stiffening member, the axially bent portion of said one of said annular disk-shaped stiffening members constituting said distance regulating means, the thickness reduction of the clamped inner marginal portion of said annular diaphragm being controlled by an axial height of said axially bent portion of said one of the annular disk-shaped stiffening members.

* * * * *